Feb. 28, 1967   R. L. HORST   3,307,196
LUNEBERG TYPE LENS FORMED BY SPIRAL WINDING ELONGATED
STRIP OF VARIABLE DIELECTRIC CONSTANT MATERIAL
Filed Dec. 28, 1962                            2 Sheets-Sheet 1

INVENTOR.
Robert L. Horst
BY Moore, Hall & Pollock
ATTORNEYS

Feb. 28, 1967 R. L. HORST 3,307,196
LUNEBERG TYPE LENS FORMED BY SPIRAL WINDING ELONGATED
STRIP OF VARIABLE DIELECTRIC CONSTANT MATERIAL
Filed Dec. 28, 1962 2 Sheets-Sheet 2

INVENTOR.
Robert L. Horst
BY
Moore, Wall & Pollock
ATTORNEYS

United States Patent Office 3,307,196
Patented Feb. 28, 1967

3,307,196
LUNEBERG TYPE LENS FORMED BY SPIRAL WINDING ELONGATED STRIP OF VARIABLE DIELECTRIC CONSTANT MATERIAL
Robert L. Horst, Manheim Township, Lancaster County, Pa., assignor to Armstrong Cork Company, Lancaster, Pa., a corporation of Pennsylvania
Filed Dec. 28, 1962, Ser. No. 247,902
23 Claims. (Cl. 343—911)

The present invention relates to the fabrication of an improved dielectric mass, particularly a lens of the two-dimensional (planar or disc) constant thickness type, e.g., a Luneberg or Kelleher dielectric lens; and is more particularly concerned with an improved module adapted to be utilized in the construction of dielectric masses, as well as with novel methods of fabricating such modules, masses, and lenses, and for testing the same.

During the last decade, there have been numerous attemps at the fabrication of high quality dielectric lenses for use at high radio frequency, and particularly at frequencies in the microwave portion of the spectrum. These lenses have been either two-dimensional in form, e.g., substantially cylindrical, or three-dimensional in form, e.g., substantially spherical, depending on the fabrication desired and the configuration of the feed antenna employed. In general, for the lenses to operate in a desired manner, appropriate lens media have been employed either of a true dielectric material or of an artificial dielectric material; and the selected material has been so disposed and fabricated as to exhibit a refractive index (or dielectric gradation) in radial directions varying substantially in accordance with a particular theoretical formula characteristic of the lens being fabricated.

The actual formula selected, characterizing the aforementioned refractive index or dielectric constant variation, varies, of course, with the particular lens being fabricated. This variation in refractive index, or in dielectric constant, is often effected by a "modular" technique, i.e., by the assembly of various individual subcomponents each of which has a known variable, or a known fixed, dielectric constant. Modules having a varying gradation have been fabricated, e.g., by variable compressing portions of the dielectric media to alter its density, or by variably loading a dielectric medium to effect a loading concentration which varies in a desired manner; and such modules have thereafter been assembled individually. A far more prevalent technique has employed fixed constant modules, however, i.e., the fabrication and subsequent assembly of various individual lens subcomponents or modules, each of which exhibits a fixed dielectric constant, varying from module to module. Appropriate assembly of such fixed constant modules then effects a step-wise approximation of the theoretical gradation desired for a particular lens.

In lenses of the known types discussed above, the modules employed have characteristically taken the form of separate blocks of material, concentric cylinders, shells, etc. Such lenses are known to be accompanied by a number of distint disadvantages. For example, the assembly of these subcomponents or modules ordinarily results in dielectric discontinuities at the abutting junctions of the subcomponents with attendant discontinuities and losses at said subcomponent junctions during assembly of the overall lens. Such discontinuities occur even with variable constant modules, unless extreme care is taken during assembly. Refinement of the lens gradation ordinarily necessitates reduction of the dielectric step size, thereby requiring constructional modules of smaller dimensions. The consequent increase in the number of modules employed has necessarily increased the cost of the lens substantially, since these various modules, being individual components, must be individually assembled into the final mass. Moreover, the increase in the number of modules has complicated the interface problem in that a multiplicity of junctions exists, each of which represents a dielectric discontinuity and, therefore, a reflecting plane. Notwithstanding such problems, the modular techniques described are widely employed, particularly when very large lenses are desired, since they have represented the only known approach to the fabrication of such large lenses.

In an effort to avoid dispersive losses, various alternative techniques have been suggested. One such technique is set forth in my prior copending application Serial No. 209,075 filed July 11, 1962, now abandoned in favor of continuation-in-part application Serial No. 477,669, filed August 2, 1965, now Patent No. 3,274,668 for "Three-Dimensional Dielectric Lens and Method of Forming the Same"; and the technique taught in said application contemplates, inter alia, the fabrication of a monolithic mass of dielectric material exhibiting a two-dimensional gradation in dielectric constant or refractive index, achieved by a gating and cross feeding arrangement operative to produce a smooth and continuous variation of material loading concentration within the mass being fabricated. The monolithic mass itself, as described in the aforementioned copending application, may be substantially cylindrical in form, and may be made in various sizes. Being monolithic, it avoids completely the mentioned dispersive losses and reflections. However, as a practical matter, certain lens size limitations are present, due to limitations in the feeding and molding equipment presently available. In addition, while the said monolithic masses can be non-destructively tested immediately upon completion of their fabrication, it has been found difficult to achieve a fine grain evaluation of all incremental portions of the entire lens during such non-destructive testing procedures.

The present invention, recognizing the inherent difficulties and disadvantages attendant conventional modular lenses and of the modules typically employed in their fabrication, and further recognizing the size limitations which attend efforts to fabricate monolithic lenses, is accordingly concerned with an improved lens, and with methods of fabricating and testing the same, which achieves the advantages of both modular and monolithic lenses, while simultaneously avoiding the mentioned disadvantages which have characterized both forms. In this respect, as will be apparent hereinafter, the present invention contemplates a fabrication technique employing a new spiral ribbon, sheet, or strip type of module; and an important advantage of the present invention resides in its capability of fabricating a lens of virtually unlimited size by interwinding identical spirals prepared from identical lens modules, with the dielectric grading of the modules being retained. Moreover, in distinction to the block or shell modules suggested heretofore, the present invention by employing the aforementioned ribbon, sheet, or strip form of module, can be more readily and accurately tested and assembled and, when assembled in the novel manners to be described, achieves final lens configurations having substantially no interface discontinuities, and exhibiting smooth and substantially continuous refractive index or dielectric gradations in at least two dimensions. Thus, the lens of the present invention achieves the gradation advantages of a monolithic lens and the size advantages of a modular lens, while simultaneously avoiding disadvantages which have characterized each type of lens heretofore.

In providing for the foregoing advantages, the present invention particularly contemplates the fabrication of a lens, or of any appropriate dielectric mass, employing one or more modules each of which takes the form of an elongated flexible and relatively thin ribbon or sheet of dielectric material exhibiting a progressive one-dimensional variation of dielectric constant in its direction of elongation. A ribbon or sheet module of the type described can be fabricated by spiral cutting a monolithic two-dimensionally graded mass of material about an axis extending transverse to said two dimensions, e.g., by spiral cutting a cylindrical lens such as has been described in my prior copending applications, identified above, about its main axis. However, other ribbon fabricating techniques can be employed by those skilled in the art so long as the desired ribbon, sheet, or strip module is ultimately produced. Such a module, alone or together with similar such modules, can be readily assembled into a lens of any desired and virtually unlimited size by winding such a module, or by interwinding plural such modules, into a tight spiral configuration. Such a ribbon module can, moreover, be accurately and non-destructively tested to facilitate its use in subsequent lens formation operations, e.g., the dielectric constant of the module can be readily and continuously monitored as a function of the module length simply by causing the said module to be fed continuously through an appropriate sensing apparatus such as a resonant cavity or admittance meter.

As will appear hereinafter, the mentioned module winding operation may be appropriately controlled to correct or modify the dielectric gradation of the mass being formed, whereby the final lens is capable of achieving very accurate quasi-optical properties, closely conforming to any preselected theoretical formula. Indeed, as will also appear hereinafter, lens symmetry is improved, and fine grain material variations are smoothed as a result of the inherent spiral "lay" and averaging effect achieved during simultaneous winding of plural ribbon modules.

It is accordingly a primary object of the present invention to provide a method of lens or mass fabrication capable of producing a lens of virtually unlimited size by the interwinding of substantially identical spirals prepared from substantially identical lens modules, with the dielectric gradation of the starting modules being retained in the final lens.

Another object of the present invention resides in the provision of a method of lens fabrication utilizing interwound spirals and adapted to permit correction or modification of dielectric gradation by the controlled rewinding of spiral modules.

Still another object of the present invention resides in an improved module, and a lens produced thereby, wherein lens symmetry is improved and fine grain variations are smoothed as a result of the inherent spiral lay and averaging effect produced by the simultaneous rewinding of spiral modules.

A further object of the present invention resides in the provision of an improved spiral module for use in lens fabrication and capable of permitting fine grain evaluation of an entire lens without necessitating destruction of the lens.

Another object of the present invention resides in the provision of an improved technique for fabricating dielectric lenses of any desired and substantially unlimited size without introducing interface reflection problems which have characterized modular lenses suggested heretofore.

A further object of the present invention resides in the provision of an improved module for use in the fabrication of dielectric lenses, taking the form of an elongated ribbon of progressively graded dielectric material. The term "ribbon" as used herein, and in the appended claims, is intended to include strips and sheets of material.

Still another object of the present invention resides in a novel method of fabricating and testing lens modules of ribbon form.

A still further object of the present invention resides in the provision of an improved dielectric lens, or mass, having a dielectric gradation which can be more precisely controlled than have been possible in modular type lenses or masses suggested heretofore.

Another object of the present invention resides in the provision of a novel dielectric lens, or dielectric mass, taking the form of one or more ribbons of dielectric material interwound in a substantially continuous spiral configuration.

A still further object of the present invention resides in the provision of a novel technique for fabricating either two-dimensional or three-dimensional lenses, or masses of dielectric material, as well as in the provision of novel two-dimensional or three-dimensional lenses or masses fabricated by such techniques.

The foregoing objects, advantages, construction and operation of the present invention will become more readily apparent from the following description and accompanying drawings, in which.

As will be appreciated from the foregoing discussion, an important advantage of the present invention resides in its capability of fabricating a lens of virtually unlimited size by the interwinding of substantially identical spiral modules. This particular facet of the invention will be discussed subsequently, particularly in reference to FIGURES 5A, 5B and 6. In order, however, to fully appreciate the concepts upon which this latter technique is based, reference will first be made to FIGURES 1 through 4.

Figure 1:
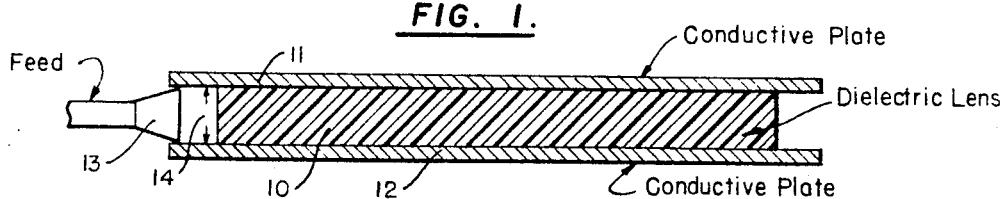
FIGURE 1 is an illustrative cross-sectional view of a prior art lens.

FIGURE 1 illustrates a typical prior art structure, the characteristics of which can be considerably enhanced by the present invention. The structure actually shown comprises a dielectric lens taking the form of a substantially cylindrical dielectric mass 10 disposed between a pair of conductive plates 11 and 12, and associated with an appropriate peripheral primary feed element such as a horn 13. The present invention is primarily concerned with the mass 10 and with methods of fabricating such masses for use with conductive plates in an assembly of the type shown in FIGURE 1, or for use without conductive plates in other assemblies known to those skilled in the art, e.g., the Kelleher constant thickness lens.

The mass 10 should exhibit a dielectric gradation in radial directions which conforms to some theoretical formula, characteristic of the lens in question. This gradation is sometimes effected by controlling the dimensions of a uniform gradient material in its vertical direction (designated 14 in FIGURE 1) and then compressing the mass to form a disk; e.g., the dimensions of the dielectric mass, in directions transverse to plates 11 and 12, may initially be made greater at the center of the mass 10 than at its edges as required to provide the necessary density, hence, dielectric constant gradation upon compression. The dielectric gradation can also be controlled, however, by appropriately varying the material employed at various different radial parts of the lens. To this effect, the mass 10 can comprise an artificial dielectric material such as an array of randomly oriented metallic particles (e.g., aluminum slivers) supported by a low density dielectric material (such as polystyrene beads), with the loading concentration of said metallic particles or slivers varying in a manner appropriate to achieve the desired dielectric gradation. In the alternative, the mass 10, rather than comprising an artificial dielectric, can be fabricated of a true dielectric material; and the density of the material at various parts thereof can be appropriately controlled to achieve the desired dielectric gradation, e.g., by appropriately mixing dielectric materials of different densities during lens fabrication.

It will be appreciated that the various artificial and true dielectric materials, discussed above, which are in themselves known to those skilled in the art, comprise the materials employed in the techniques discussed hereinafter, when lenses are to be fabricated. Various other materials can be employed, however, when the final structure is to be used in other environments.

In the particular structure shown in FIGURE 1, the graded mass 10 can be either monolithic in nature, or it can be of modular type. If monolithic, it is subject to the size limitations and to the possible fine grain evaluation difficulties which have already been discussed. On the other hand, if the mass is modular in form, to increase the size of the overall lens, it is also subject to testing difficulties and is further subject to reflections, dispersive losses, etc., as already described. For purposes of the present description, a lens fabrication technique will be described which ultimately achieves a mass such as may be employed, for example, at 10 in the arrangement of FIGURE 1; and, as will appear hereinafter, the resultant mass is not subject to the aforementioned size limitations or to testing difficulties, or to dispersive losses which have characterized graded dielectric masses conventionally employed heretofore. The discussion of the techniques, etc., which follow should not be construed as limited, however, to the particular arrangement of FIGURE 1; and, other applications for the methods, and for structures formed thereby, will be readily apparent to those skilled in the art. One such alternative arrangement is, indeed, shown in FIGURE 7.

Figure 2:
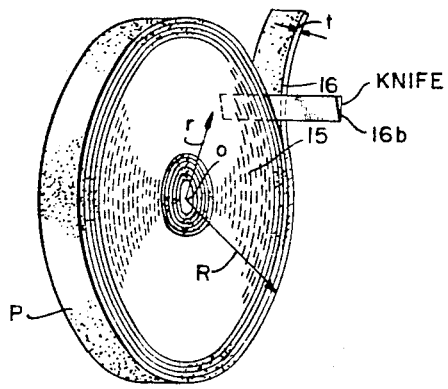
FIGURE 2 illustrates a two-dimensionally graded material spiral cut in accordance with the technique of the present invention to form a ribbon type module.

Referring now to FIGURE 2, let us initially assume that we start with a mass 15 which exhibits a dielectric gradient in at least two dimensions. Starting mass 15 is preferably monolithic, and preferably exhibits a smooth and substantially continuous variation in dielectric constant in its radial directions $r$, between the zero center O of said mass and its outer periphery P. Such a starting mass can be fabricated by cross-feeding true or artificial dielectric materials through appropriately contoured gates into a charge box or mold, followed by a molding of the collected mixed material; and a technique operative to achieve such a monolithic mass 15 has been described in my aforementioned prior copending applications.

The particular starting mass 15 shown in FIGURE 2 is assumed to be substantially cylindrical in shape, and of radius R. As illustrated, said starting mass, when continuously cut in a spiral configuration from and about its zero center axis, may be formed into an elongated, continuous, and relatively flexible ribbon type module 16. Starting masses exhibiting the desired two-dimensional gradation, but having other shapes, could equally well be selected. The peeling or spiral cutting of mass 15 can be accomplished by a commercially available band knife (shown diagrammatically at 16b in FIGURE 2), having an appropriate progressive feed, to form a strip 16 having a total length S and a constant thickness $t$ of any appropriate dimension. In a typical case, the dimension $t$ was selected to be ⅜ inch; and a cylindrical mass 15 having a thirty-six inch diameter and a one inch height (although it could be appreciably higher, e.g., eighteen inches), was peeled continuously to produce a final strip 16 having a total length S in excess of 200 feet.

The actual dielectric gradation of mass 15, in radial directions, depends upon the particular type of lens being fabricated. If, for purposes of illustration only, we assume that the gradation is in accordance with the Luneberg theory, the relative dielectric constant ($\epsilon$) of the mass 15 in radial directions can be expressed by the formula $$\epsilon = 2 - \frac{r^2}{R} \qquad (1)$$

where:
$R$ = the radius of mass 15,
$r$ = the radial variable between the center O and outer periphery P of the mass, and
$\epsilon$ = the relative dielectric constant of the dielectric material constituting mass 15, at any particular radius $r$.

Figure 3A:
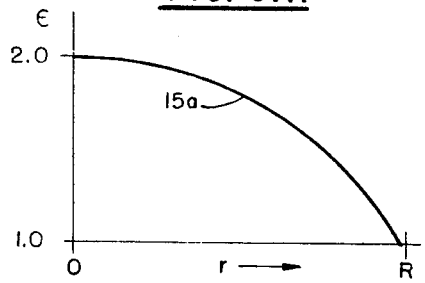
FIGURES 3A, 3B and 3C are curves showing certain characteristics of the mass and module shown in FIGURE 2.

In the Luneberg case, Formula 1 for the monolithic mass 15 can be plotted in the manner illustrated at 15a in FIGURE 3A. It may be seen by evaluation of Equation 1 that the mass 15 is such that it exhibits a dielectric constant of substantially unity at its outermost periphery and a higher dielectric constant, 2.0, at its center O.

Curve 15a shown in FIGURE 3A has been plotted against the coordinate $r$. Examining Equation 1 above, however, it will be noted that the only variable on the right-hand side of the equation is the factor $r^2$. If the characteristics of the Luneberg graded mass 15 are plotted as a function of $r^2$ rather than of $r$, the curve becomes substantially linear in form; and this alternative plot has been shown at 15b in FIGURE 3B.

Having started with a mass 15 of the type discussed above, and having peeled or spirally cut said mass, in the manner already described, into a strip, sheet, or ribbon 16 of constant thickness $t$ having a total length S, let us now examine the characteristics of the ribbon 16 so formed. It should first be noted that a face area of the mass 15, prior to peeling, can be represented by the equation $$A = \pi R^2 \qquad (2)$$

where:

$A$ = the surface area of a circular face of the mass 15, and
$R$ = the radius of said mass.

The area can similarly be represented by the equation $$A = St \qquad (3)$$

where:

$S$ = the total length of the ribbon 16 produced, and
$t$ = the ribbon thickness.

If we now consider Equations 2 and 3, it will further be seen that, at any particular radius $r$, the surface area of the lens subtended by revolution of said radius $r$ can be represented as either a function of $r$ or a function of $s$ by the equation $$A = \pi r^2 = st \qquad (4)$$

where $s$ = the length variable of the peeled strip for the particular radius $r$ chosen.

Equation 4 can, by transposition, be written in the following form:

$$s = \frac{\pi r^2}{t} \qquad (5)$$

Examining Equation 5, we therefore find that the length variable $s$ is proportional to $r^2$. Equation 5, representing the gradation characteristics of strip 16, can be plotted in the manner shown at 16a in FIGURE 3C.

Figure 3B:
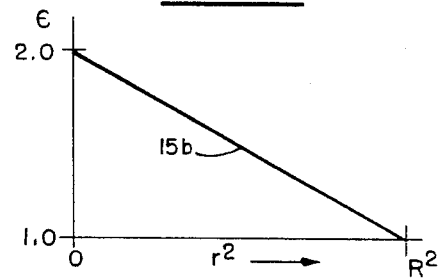
Figure 3C:
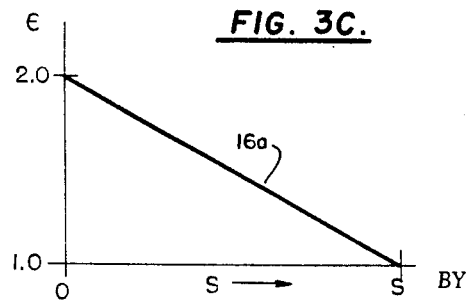

If we compare FIGURES 3B and 3C, it becomes apparent that curves 15b and 16a are the same. In short, the radial grading function which characterized the initial monolithic mass 15 is now reduced to a substantially tangential grading function when said mass 15 is spirally cut into an elongated continuous strip or ribbon 16 in the manner described. In the Luneberg case, in particular, the spiral cutting of cylinder 15 reduces a radial nonlinearly graded disk to a ribbon type module 16 which exhibits a substantially linear dielectric gradation along its length. It follows, of course, that the ribbon is graded additionally in directions normal to the cutting planes.

Figure 4:
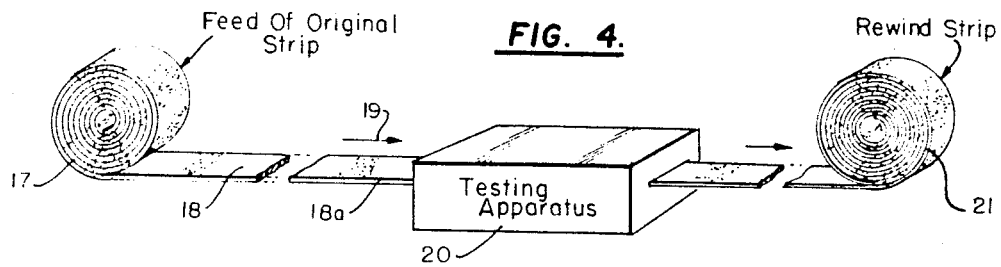
FIGURE 4 is an illustrative view of a testing procedure such as may be employed with the module of the present invention.

A spiral module, such as the flexible ribbon 16 formed by the spiral cutting technique mentioned (or by any other technique adapted to effect an appropriate progressive variation in dielectric constant along the strip), or formed by the juxtaposition, along a spiral path of small uniform dielectric constant submodular pieces varying in index from piece to piece in an appropriate manner, exhibits very significant advantages over modular configurations suggested heretofore. One such advantage arises immediately in the testing of the module; and a highly simplified, but more accurate, testing procedure is now made available, as illustrated in FIGURE 4.

The original cylindrical mass, after being peeled into a ribbon or spiral strip form can be coiled for handling purposes, into a spiral as indicated at 17; and the strip or ribbon module, comprising the spiral mass 17, is illustrated at 18 and 18a. To test said strip module 18a, the strip may be fed continuously along a path 19 through a testing apparatus generally indicated at 20. The testing apparatus itself can take any of many well known forms, and is provided primarily to monitor continuously the dielectric constant of the strip 18a being fed therethrough. One such testing apparatus which can be utilized comprises an admittance meter arrangement utilizing a pair of spaced conductive plates between which the strip 18a continuously passes, thereby functioning as a dielectric cooperating with said plates to form a capacitor. The effective capacitive reactance of the resultant assembly can be continuously monitored during the passing of the strip between said spaced conductive plates, and said reactance changes with changes in the dielectric constant of strip 18a, thereby providing a measure of the strip dielectric constant. One admittance meter operating in the described manner is shown for example in my prior copending application Serial No. 52,932 filed August 30, 1960, for "Admittance Meter and Dielectric Control System," now U.S. Patent No. 3,149,650, issued September 22, 1964. Other testing apparatuses, adapted to continuously monitor the dielectric constant of strip 18a, can also be employed at 20, however, e.g., a resonant cavity.

If the starting mass (e.g., 15) exhibits a Luneberg gradation, the stripping or peeling procedure described above will, as also described, produce a strip or ribbon of material 18 or 18a having a dielectric constant which varies progressively as a substantially linear function of the ribbon length. Such a linear function is easy to monitor. If, in the course of monitoring the dielectric constant of strip 18a, it is found that the actual dielectric constant of the ribbon, or of incremental portions of the ribbon, departs from the required linear function of ribbon length, the original manufacturing procedure can be appropriately revised to modify the dielectric gradation in the starting mass so as to effect an appropriate correction in the dielectric material, or in its loading concentration, at that point in the monolithic starting mass where the departure has occurred. Accordngly, a fine grain evaluation and revision of all parts of the monolithic mass can be readily made. Similar such revisions can be effected to correct the strip or ribbon characteristics directly, simply by cutting and splicing with appropriate other ribbon sections. Moreover, if a deviation from the anticipated dielectric constant, or function, should be detected during the continuous monitoring of the ribbon 18a, appropriate notation of this deviation can be made, thereby to permit the introduction of correction factors during later use of the strip as a module in the fabrication of lenses or dielectric masses.

In this latter respect, it will be appreciated that the ribbon 18 (or 18a) can be wound alone, or with similar such ribbon modules, into a dielectric mass. FIGURE 4 depicts a single rewinding of the strip at 21. The continuous representation of testing and rewinding shown in FIGURE 4 should, in practice, be supplemented by appropriate handling techniques, to get proper portions of the strip into proper places in the rewound mass.

When a strip or ribbon type module is spirally wound to produce a disk or cylinder shaped final mass, the technique in effect produces a lens or dielectric mass having a desired radially graded dielectric constant, formed continuously and directly from a modular element having a progressive one-dimensional gradient. A ribbon such as 18a has, moreover, proven to be an especially good modular unit to employ in lens or dielectric mass fabrication since, during winding or rewinding of the mass, tight interfaces are formed between adjacent contiguous wraps. This, in turn, substantially eliminates reflection problems which have characterized modular units suggested heretofore, wherein the interfaces often exhibit physical discontinuities (e.g., air gaps or cement joints) which enhance such reflection problems.

The linear function of dielectric constant vs. ribbon length mentioned above is present in that specific situation where the starting mass has a Luneberg gradation, or where the ribbon is fabricated for use in producing a final Luneberg lens. If the starting mass as originally prepared is fabricated with some gradation other than that contemplated by Luneberg, or if the ribbon is to be used in fabricating a lens other than a Luneberg lens, the variation in dielectric constant along the ribbon length will normally exhibit a characteristic other than the linear characteristic mentioned. The actual function of dielectric constant vs. ribbon length can, however, be readily calculated once it is known what radial gradation was theoretically placed in the starting mass, or what gradation is desired in the final rewound mass; and with this information, continuous monitoring of the ribbon, with resultant fine grain testing of the starting or final mass, can be effected in the manner described, thereby to permit the described corrections to be effected in the starting mass fabrication or during ultimate use of the ribbon module.

A ribbon module such as 18a can, as mentioned previously, be interwound with similar such ribbons to get a lens of any desired and substantially unlimited dimensions. The several ribbons can, in such an interwinding operation, be of either the same or of different thicknesses. Thus, starting with a plurality of substantially identical starting masses, such as plural substantially identical monolithic cylinders, the various masses can be individually cut in the manner described into elongated ribbons. The plural ribbons resulting from this cutting operation can then be interwound with one another to produce a lens having a larger diameter than that which was present in any one of the starting masses individually. Any desired number N ribbons can be interwound with one another in this manner.

Figure 5A:
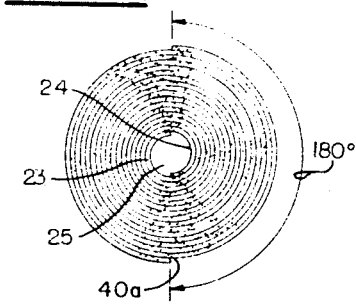
FIGURES 5A and 5B illustrate, respectively, two possible winding operations employing plural modules constructed in accordance with the present invention.

If all of said N ribbons are interwound at the same time, with their corresponding ends N simultaneously disposed adjacent the center of the resulting mass, the various ends of said N ribbons should be angularly displaced from one another by substantially 360/N degrees. FIGURE 5A shows a dielectric cylinder produced by the interwinding of two ribbons 23 and 24 on a prefabricated starting core 25; and the innermost or high dielectric constant ends of the ribbons 23 and 24, in such a two ribbon interwound arrangement, are preferably displaced from one another adjacent portions of the starting core 25, by substantially 180 degrees. The starting core 25 is not mandatory, but provides a convenient means of starting the assembly. Additionally, in band sawing, a small core remains and, obviously, must be replaced.

Figure 5B:
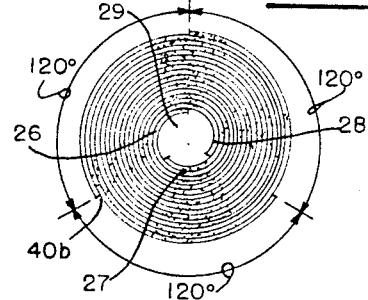

FIGURE 5B shows an arrangement, generally analogous to that described in reference to FIGURE 5A, wherein a dielectric mass is formed by interwinding three substantially identical ribbons 26, 27 and 28 on an optional prefabricated starting core 29. In the case of the three interwound ribbons, the innermost ends of the ribbons are, as illustrated in FIGURE 5B, displaced by substantially 120 degrees.

When N ribbons are wound simultaneously, each of which ribbons was originally derived from a starting cylinder having a radius R, the resultant rewound mass has an increased radius equal to $\sqrt{N}$ times said radius R. This situation will be readily appreciated if we assume that the original starting masses have an area A and a radius R, whereas the final lens or mass has an area $A_N$ and a radius $R_N$. It will be then seen, by reference to Equations 2, 3, and 4, supra, that $$A_N = \pi R_N^2$$

and that $$A_N = NSt = NA = N\pi R^2$$

Thus, we find that $$\pi R_N^2 = N\pi R^2$$
$$R_N^2 = NR^2$$
$$R_N = \sqrt{N}\ R$$

Any number N strips can be employed, to form a final cylinder of any desired radius. Moreover, surprisingly enough, it is found in practice that if one uses substantially identical starting cylinders to form substantially identical strips, sheets, or ribbon modules, the simultaneous interwinding of the plural ribbons does not produce any significant discontinuities in the final mass, nor does it produce any significant deviation from the theoretical dielectric gradation over the radius of the resultant mass of interwound ribbons. Indeed, such simultaneous rewinding not only gives the capability of fabricating a lens of virtually unlimited size, but, in practice, actually smooths out random dielectric variations which may have occurred in the individual starting masses. Thus, if the original monolithic or starting masses are not identical, and individually exhibit random gradation errors, the interwinding of plural ribbons derived from these different starting masses tends to average out the aforementioned random errors thereby producing a final lens having better characteristics than that of any of the original cylindrical masses. Moreover, if the individual starting masses exhibit in common some systematic or massive gradation error, the rewinding of plural ribbons derived from such masses tends to distribute the systematic error angularly and radially in the form of a plurality of smaller incremental errors spread over a larger total area, thereby again reducing the error. If such systematic errors do appear in the original starting masses, however, the nature and position of such errors should be initially analyzed so that, during the rewinding operation, a rewinding process can be appropriately chosen to best average out the errors.

It should be further noted that when plural ribbons are interwound, e.g., in the manner shown in FIGURES 5A and 5B, one does not actually form a "stepped" lens as that term is normally considered. Such step-function lenses are now fabricated, for example, by the assembly of concentric shells or the like, each of which has a fixed dielectric constant, in a modular array; and the step-function produced in such assembled arrays known heretofore results from the dielectric discontinuities or steps which necessarily occur at the junctions of the different dielectric constant modules. When plural progressively graded ribbons are interwound, however, the use of a staggered start, as described in reference to FIGURES 5A and 5B, and the variation in compression and tension of incremental portions of each ribbon (due to their final displaced or rewound position as compared with their original position in the starting mass), so positions and corrects the incremental gradients of each ribbon as to produce a substantially smooth gradation across the resulting rewound structure. Thus, notwithstanding the fact that a type of modular technique is employed in interwinding plural ribbons, the dielectric gradient of the resulting mass closely approaches that of a continuously graded monolithic mass, while at the same time achieving the increased size advantages which have characterized modular techniques heretofore.

Figure 6:
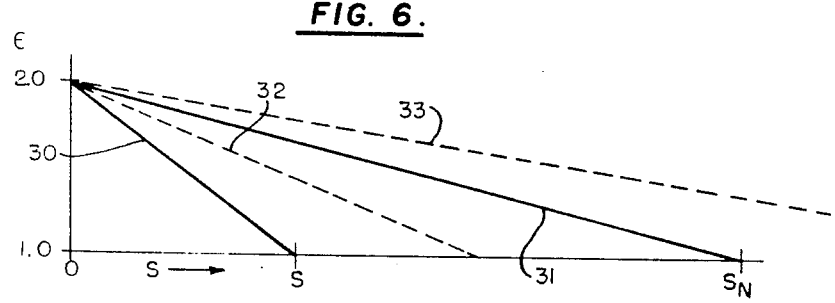
FIGURE 6 is a graphical representation of certain mass characteristics achieved when plural modules are interwound.

The rewinding of N ribbons, and the characteristics of the resulting mass, can be plotted graphically in the manner shown in FIGURE 6.

Curve 30 shows the characteristics of a single ribbon and corresponds to the curve previously discussed in reference to FIGURE 3C. When N ribbons are interwound simultaneously, a new curve 31 is produced which has a slope $1/N$ times the original slope of curve 30. The dielectric gradation represented by curve 31 is accordingly the same as that represented by curve 30, except that the graduation is now stretched out over a greater final radius. As a practical matter, an infinite number of curves would be effected depending solely upon the number N chosen; and certain alternative such curves, for N less than and greater than the value of N chosen for curve 31, have been represented in dotted configuration at 32 and 33. The particular curves thus illustrated in FIGURE 6 have, of course, been plotted on the assumption that a Luneberg gradation is involved, wherefore the curves would be essentially linear in nature as discussed previously. Analogous such curves could, however, be plotted for any theoretical gradation.

It should further be noted that the different slopes which characterize the curves 31 through 33 inclusive can be used to good effect in the preparation of a ribbon, sheet, or strip module lens which more closely approaches theoretical requirements than has been possible heretofore. Thus, it may be found that a particular strip, when wound alone, exhibits a desired characteristic over a portion of the resulting mass, and some undesired characteristics over other portions of the mass. To overcome this, one is able to utilize the infinite number of available different slopes in a controlled rewinding operation, thereby to correct or modify the dielectric grading exhibited by a composite lens formed of interwound strips. In this respect, the winding of a lens may be commenced and continued with a single strip up to that point where the gradient of the mass tends to deviate from a desired characteristic. At that point or location, an additional strip may be introduced and interwound with the first strip to appropriately modify the slope of the curve, e.g., back toward a desired linear curve. The initial turn must, of course, be tapered to provide a smooth transition. A similar operation may be effected after the two strips have been interwound for a portion of their length, thereby to introduce a third strip at the point where the composite characteristic of the two strips ends to deviate from a desired characteristic, etc. The possible points for introduction of successive additional strips would ideally be spaced radially outward of one another; and possible such points have been designated, for purposes of illustration only, in FIGURES 5A and 5B, at locations 40a (for the introduction of a third strip) and 40b (for the introduction of a fourth strip).

Thus, any desired composite gradation can be effected simply by adding or subtracting ribbons of appropriate dielectric gradation at appropriate points in the winding. The resulting mass would be characterized by a strip arrangement which would start with one or more strips wound outwardly from the center of the mass, supplemented (or lessened) by an additional strip or strips at some point spaced radially outward of the center, supplemented (or lessened) by a still further strip or strips at a point even farther radially outwardly, etc.; and this composite controlled rewinding would, in effect, fit together curve portions of different slopes at appropriate points in the rewound mass thereby to achieve any final desired composite curve, e.g., of the type shown at 31 in FIGURE 6.

Figure 7:
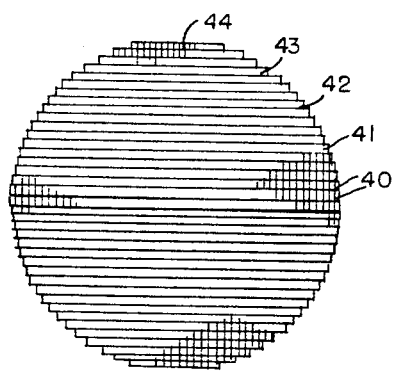
FIGURE 7 is an illustrative view of a three-dimensionally graded lens formed by the techniques of the present invention.

It should, moreover, be noted that while the discussion thus far has considered the use of strip or ribbon modules in the preparation of two-dimensionally graded masses, e.g., cylindrical or disk shaped masses, such modules can also be utilized effectively in the preparation of a three-dimensionally graded mass. Such an arrangement is shown in FIGURE 7, which represents a substantially spherical mass formed by the individual preparation of wound disks such as those shown in FIGURES 5A and 5B, with said individual disks thereafter being superposed upon one another. The superposed disks are of successively different diameters and could be formed, starting with individual substantially identical strip or ribbon modules, by cutting successively different lengths away from the high dielectric constant ends of said different strips, and then rewinding the resultant successively different length strips. The rewound strips appearing near the center of the substantially spherical mass, and indicated for example at 40, would comprise one or more strips or ribbons interwound for example in accordance with the technique described in reference to curve 31 of FIGURE 6. Above and below the center section represented by wound strips 40, the radius of the wound strips becomes successively less due to the successive strip shortening operations described; and as a result, successively different diameter disks such as 41, 42, 43, and 44 could be formed above the center plane, and could similarly be formed below the center plane, represented by maximum diameter disks 40. Since the individual stacked disks or pancakes are each formed by the winding of strips which retain their lower dielectric constant ends, and which have successively different lengths removed from their high dielectric constant ends, the proper dielectric gradation is achieved throughout the resulting spherical lens.

It will further be appreciated that the stacked disks which are employed in the arrangement of FIGURE 7 would normally be cemented to one another, or in the alternative, could be held in appropriate position relative to one another by surrounding tapes or by an outer protective and retaining shell. Moreover, since there is no limit to the size of each individual disk which may be formed, so also the dimensions of the substantially spherical lens produced by the technique shown in FIGURE 7 is unlimited for all practical purposes. The technique thus permits the formation of any size sphere, including extremely large spherical masses, by the use of modules which can be far more easily handled, far more readily tested and evaluated, and far more accurately assembled to produce a desired gradation, than has been possible heretofore.

While I have thus described preferred embodiments of the present invention, it will be appreciated that many variations can be made by those skilled in the art. For example, the spiral layout of lens modules in itself achieves assembly and gradation benefits. Such a spiral layout can be used to advantage even without employing a continuous ribbon or ribbons, e.g., by building up a modular lens by means of small or short uniform index pieces, laid out in a spiral or polar configuration, rather than in a rectangular or cartesian plan, with the index varying in an appropriate manner from piece to piece in such a spiral layout. Moreover, while the techniques disclosed are particularly useful when applied in the fabrication of dielectric lenses, they may also be used to good advantage in the fabrication of other circular pieces where the precise control of properties is required. In addition, it is obvious that the technique is not restricted to use of dielectric or artificial dielectric materials, and/or to devices fabricated therefrom, although it has especially good application in such fields. The foregoing description should, therefore, be considered as illustrative only of the present invention and not limitative thereof; and all such variations and modifications as are in accord with the principles described are meant to fall within the scope of the appended claims.

Having thus described my invention, I claim:

1. The method of forming a substantially flat-surface disk-shaped mass of dielectric material exhibiting a radial dielectric gradation, comprising the steps of fabricating an elongated substantially constant width ribbon of dielectric material having a progressive variation in dielectric constant in the direction of its elongation, and coiling said ribbon about one of its ends in a continuous plurality of spiral convolutions, said ribbon fabricating step comprising fabricating a monolithic mass of dielectric material, and thereafter cutting said monolithic mass in a continuous spiral configuration to produce said ribbon.

2. The method of forming a mass of dielectric material comprising the steps of fabricating a plurality of elongated ribbons of dielectric material, each of said ribbons exhibiting a variation in dielectric constant in its direction of elongation, and thereafter coiling said ribbons together upon one another, in a plurality of interwound contiguous convolutions to form a disk-shaped mass.

3. The method of claim 2 wherein the coiling of at least one of said ribbons is commenced at a point closely adjacent the center of said disk-shaped mass, the coiling of at least one other of said ribbons being commenced at a position disposed radially outward of said point in said disk-shaped mass.

4. The method of claim 2 wherein the coilings of at least two of said ribbons are commenced respectively at points disposed at substantially like radial distances from the center of said disk-shaped mass, said points being angularly displaced from one another.

5. The method of claim 4 wherein a plurality of N ribbons have their coilings commenced at a plurality N of said points, the angular displacement between adjacent ones of said points being substantially $360/N$ degrees.

6. The method of claim 2 wherein said plurality of ribbons are of substantially the same thickness.

7. The method of preparing a module for fabrication of a mass of dielectric material, which comprises the steps of cutting a substantially cylindrical monolithic mass of dielectric material, exhibiting a two-dimensional variation in dielectric constant, in a substantially continuous spiral extending from the center of said mass toward the outer periphery of said mass thereby to convert said substantially cylindrical mass into a continuous ribbon, and thereafter passing said ribbon continuously through a dielectric sensing apparatus to monitor the dielectric constant of said ribbon continuously as a function of the ribbon length.

8. The method of claim 7 including the further step of winding said ribbon in a series of closely contiguous convolutions subsequent to said monitoring step to form said ribbon into a substantially disk-shaped mass of dielectric material.

9. The method of forming a circularly symmetrical mass of dielectric material exhibiting a radial dielectric gradation therein, comprising positioning pieces of dielectric material, having different dielectric constants, in a substantially continuous spiral configuration about a preselected axis with the dielectric constants of said pieces varying progressively in a predetermined manner along said spiral configuration.

10. The method of preparing a dielectric lens having a predetermined two-dimensional variation in dielectric constant, comprising the steps of fabricating a plurality of elongated ribbons of dielectric material each of which has a progressive one-dimensional dielectric constant variations in the direction of its elongation, and spiral winding said ribbons in a continuous series of progressively larger turns about a common center, said winding step being conducted simultaneously on said plurality of ribbons with said ribbons being disposed in side-by-side relation to one another during the simultaneous winding thereof, each of said ribbons being disposed in laterally overlapping relation to at least a portion of another of said ribbons during said winding, and said ribbons having their innermost ends respectively disposed at different positions relative to said common center at the commencement of said winding.

11. The method of claim 10 wherein the different positions of said innermost ribbon ends comprise different angular positions around said common center.

12. The method of claim 10 wherein the different positions of said innermost ribbon ends comprise different radial positions relative to said common center.

13. The method of fabricating a substantially cylindrical mass of dielectric material having a desired radial dielectric gradient, comprising the steps of fabricating a starting mass of said material having a dielectric gradient in at least two dimensions, spiral cutting said starting mass about an axis transverse to said two dimensions to convert said starting mass into an elongated continuous ribbon having a dielectric gradient in its direction of elongation, measuring the dielectric gradient of said ribbon as a function of its length, rewinding said ribbon in a spiral configuration about one of its ends, and inserting at least one piece of dielectric material between adjacent wraps of said ribbon during said rewinding operation and in accordance with the results of said measuring step to control the dielectric gradient of the cylindrical mass formed by said rewinding operation at selected radial positions thereof.

14. The method of testing a dielectric mass having a dielectric gradient in at least two dimensions, comprising the steps of uniformly spiral cutting said mass about an axis transverse to said two dimensions to convert said mass into an elongated continuous ribbon of substantially fixed thickness having a substantially one-dimensional dielectric gradient in its direction of elongation, measuring the dielectric constant of said ribbon as a function of its length, and thereafter spirally rewinding said ribbon.

15. A two-dimensional substantially constant thickness dielectric lens comprising a plurality of elongated likewidth relatively flexible modules of dielectric material, each of which exhibits a progressive one-dimensional variation in dielectric constant in at least its direction of elongation, disposed side-by-side to one another in a spiral configuration of interleaved overlapping turns.

16. A circularly symmetrical mass of dielectric material exhibiting a radial dielectric gradation therein, comprising a plurality of pieces of dielectric material positioned in a substantially continuous spiral configuration about a central axis, the dielectric constant of said pieces varying from piece to piece in a preselected manner along said spiral.

17. A mass of dielectric material comprising a plurality of elongated sheets of dielectric material continuously coiled upon one another in a plurality of interwound contiguous convolutions, each of said sheets comprising a dielectric material having a progressive variation in dielectric constant in the direction of elongation of said sheet.

18. A mass of dielectric material comprising a plurality of elongated dielectric ribbons disposed in interwound spiral configuration the dielectric constant of at least one of said ribbons varying in the direction of elongation of said ribbon, the innermost ends of said spirally disposed ribbons being angularly displaced from one another.

19. The mass of claim 18 wherein the innermost ends of at least two of said ribbons are also radially displaced from one another.

20. A dielectric lens having a predetermined dielectric gradation in at least two dimensions, comprising a plurality of elongated ribbons of dielectric material each of which has a progressive one-dimensional dielectric constant variation in the direction of its elongation, said ribbons being spirally interleaved with one another in a continuous series of progressively larger turns about a common center, each of said ribbons being disposed in laterally overlapping relation to at least a portion of another of said ribbons, and said ribbons having their innermost ends respectively disposed at different positions relative to said common center.

21. The dielectric lens of claim 20 wherein the different positions of said innermost ribbon ends comprise different angular positions around said common center.

22. The dielectric lens of claim 20 wherein the different positions of said innermost ribbon ends comprise different radial positions relative to said common center.

23. The method of forming a substantially flat-surfaced disk-shaped mass of dielectric material exhibiting a radial dielectric gradation, comprising the steps of fabricating a cylindrical monolithic mass of dielectric material, thereafter cutting said monolithic dielectric mass in a spiral path progressing radially at a substantially uniform rate to produce an elongated substantially constant width and substantially constant thickness ribbon of dielectric material having a progressive variation in dielectric constant in the direction of its elongation, and coiling said ribbon about one of its ends in a continuous plurality of spiral convolutions.

References Cited by the Examiner

UNITED STATES PATENTS

| | | | |
|---|---|---|---|
| 2,761,141 | 8/1951 | Strandberg et al. | 343—911 |
| 3,079,551 | 2/1963 | Walker | 343—95 |
| 3,115,271 | 12/1963 | Anderson et al. | 343—911 |

FOREIGN PATENTS 1,058,285  11/1953  France.

OTHER REFERENCES

Peeler et al.: Microwave Stepped-Index Luneberg Lenses, NRL Report 4843, October 26, 1956, pages 1–5.

ELI LIEBERMAN, *Primary Examiner.*